(12) United States Patent
Narayanaswamy

(10) Patent No.: US 11,889,029 B1
(45) Date of Patent: *Jan. 30, 2024

(54) SYSTEMS, METHODS, DEVICES AND ARRANGEMENTS FOR UNIFIED MESSAGING

(71) Applicant: 8x8, Inc., Campbell, CA (US)

(72) Inventor: Ramprakash Narayanaswamy, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,709

(22) Filed: Jun. 21, 2022

Related U.S. Application Data

(63) Continuation of application No. 17/203,516, filed on Mar. 16, 2021, now Pat. No. 11,368,590, which is a continuation of application No. 16/776,288, filed on Jan. 29, 2020, now Pat. No. 10,951,772, which is a continuation of application No. 15/702,214, filed on
(Continued)

(51) Int. Cl.
| | |
|---|---|
| *H04M 3/00* | (2006.01) |
| *H04M 5/00* | (2006.01) |
| *H04M 7/00* | (2006.01) |
| *H04M 3/53* | (2006.01) |
| *H04M 3/56* | (2006.01) |
| *H04L 51/52* | (2022.01) |

(52) U.S. Cl.
CPC ............ *H04M 7/006* (2013.01); *H04L 51/52* (2022.05); *H04M 3/53* (2013.01); *H04M 3/56* (2013.01); *H04M 7/0015* (2013.01); *H04M 2203/253* (2013.01); *H04M 2203/4509* (2013.01)

(58) Field of Classification Search
CPC .......... H04M 7/006; H04M 3/53; H04M 3/56; H04M 7/0015; H04L 5/52
See application file for complete search history.

(56) References Cited

U.S. PATENT DOCUMENTS 8,090,779 B2 * 1/2012 Ludwig ................... H04L 51/04
709/206
8,150,922 B2 * 4/2012 Griffin .................. H04L 65/765
709/206

(Continued)

*Primary Examiner* — Simon King
(74) *Attorney, Agent, or Firm* — Crawford Maunu PLLC

(57) ABSTRACT

In one example, a communications system and platform communications platform: provides data communications services, over at least one of the plurality of communication networks, involving a plurality of different or disparate communications systems respectively associated with a plurality of respectively different formats to a plurality of communication user-operable devices each of which has a user interface for communicating information; conveys the data communications services via a browser and to establish an electronic meeting between multiple individuals, the electronic meeting providing access to a plurality of different types of content, or of different format types; and generates, in response to the electronic meeting being established, a status message that is associated with the electronic meeting, that provides an update message to at least a subset of the plurality of communications systems, and that provides information regarding possible availability of an individual for participating in the electronic meeting.

22 Claims, 3 Drawing Sheets

Related U.S. Application Data

Sep. 12, 2017, now Pat. No. 10,554,819, which is a continuation of application No. 14/528,085, filed on Oct. 30, 2014, now Pat. No. 9,762,738, which is a continuation of application No. 13/211,900, filed on Aug. 17, 2011, now Pat. No. 8,917,855.

(60) Provisional application No. 61/374,447, filed on Aug. 17, 2010.

(56) References Cited

U.S. PATENT DOCUMENTS

| | | | | |
|---|---|---|---|---|
| 8,346,864 | B1* | 1/2013 | Amidon | G06Q 10/10 |
| | | | | 709/224 |
| 8,499,248 | B1* | 7/2013 | Keel | G06F 16/9537 |
| | | | | 715/753 |
| 2009/0006333 | A1* | 1/2009 | Jones | G06Q 30/02 |
| 2009/0019367 | A1* | 1/2009 | Cavagnari | G06F 21/84 |
| | | | | 715/716 |

* cited by examiner

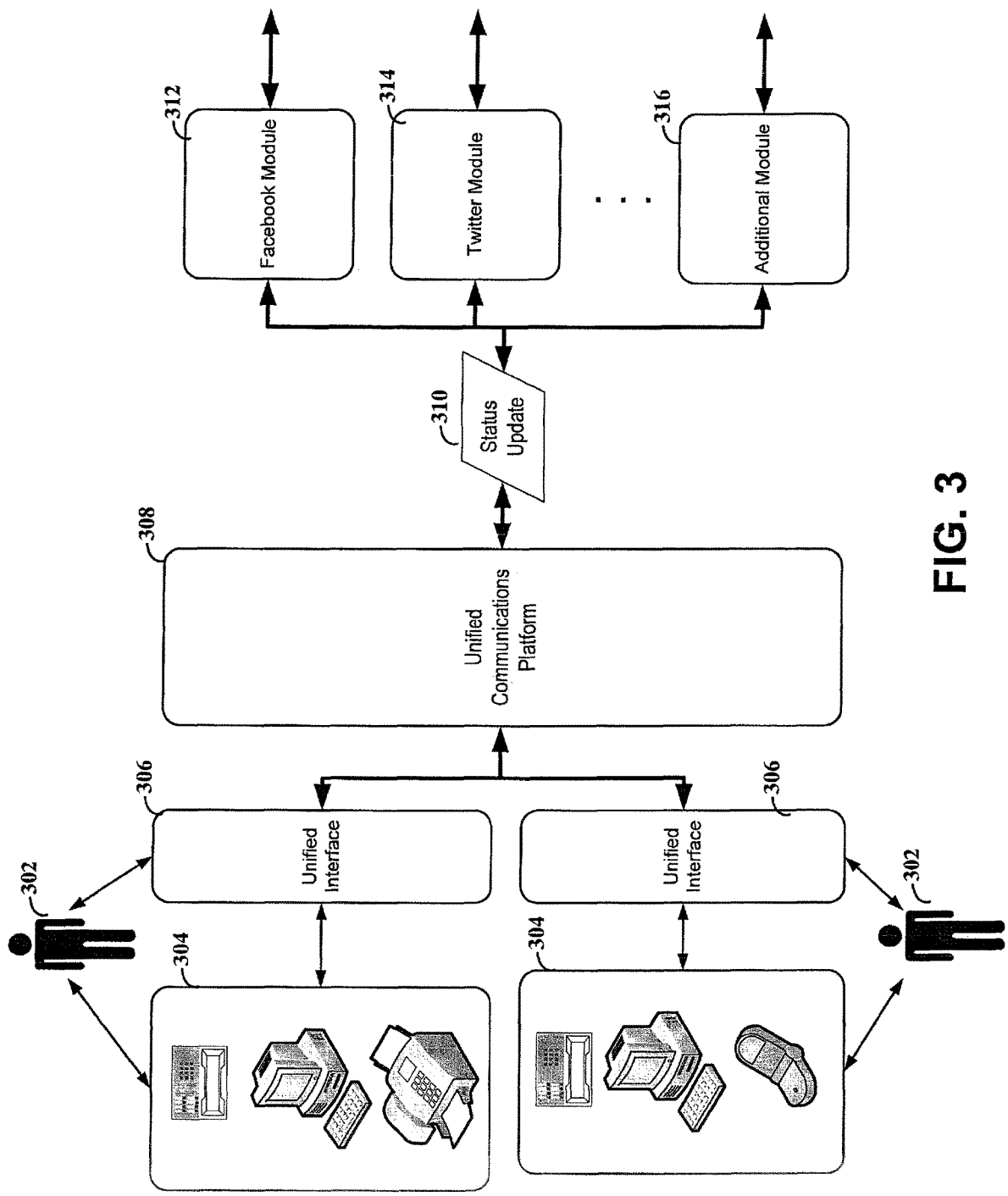

SYSTEMS, METHODS, DEVICES AND ARRANGEMENTS FOR UNIFIED MESSAGING

OVERVIEW

Advances in technology are providing more and more options for individuals to communicate with one another. Voice over Internet Protocol (VoIP), email, texting, PSTN, instant messaging (IM) services and other communication formats each provide different communication options to individuals. The various different communication formats have respective advantages and disadvantages. Aspects of the present disclosure relate to a comprehensive system that coordinates multiple communication formats and provides a single, unified interface for use therewith. Embodiments are configured for use with databases, cloud computing services, internal call routing, automated functions and/or call center applications.

BRIEF DESCRIPTION OF THE DRAWINGS

The disclosure may be more completely understood in consideration of the following detailed description of various embodiments of the disclosure in connection with the accompanying drawings, in which:

FIG. 3 depicts a system diagram for interfacing with social networks, consistent with embodiments of the present disclosure.

Figure 1:
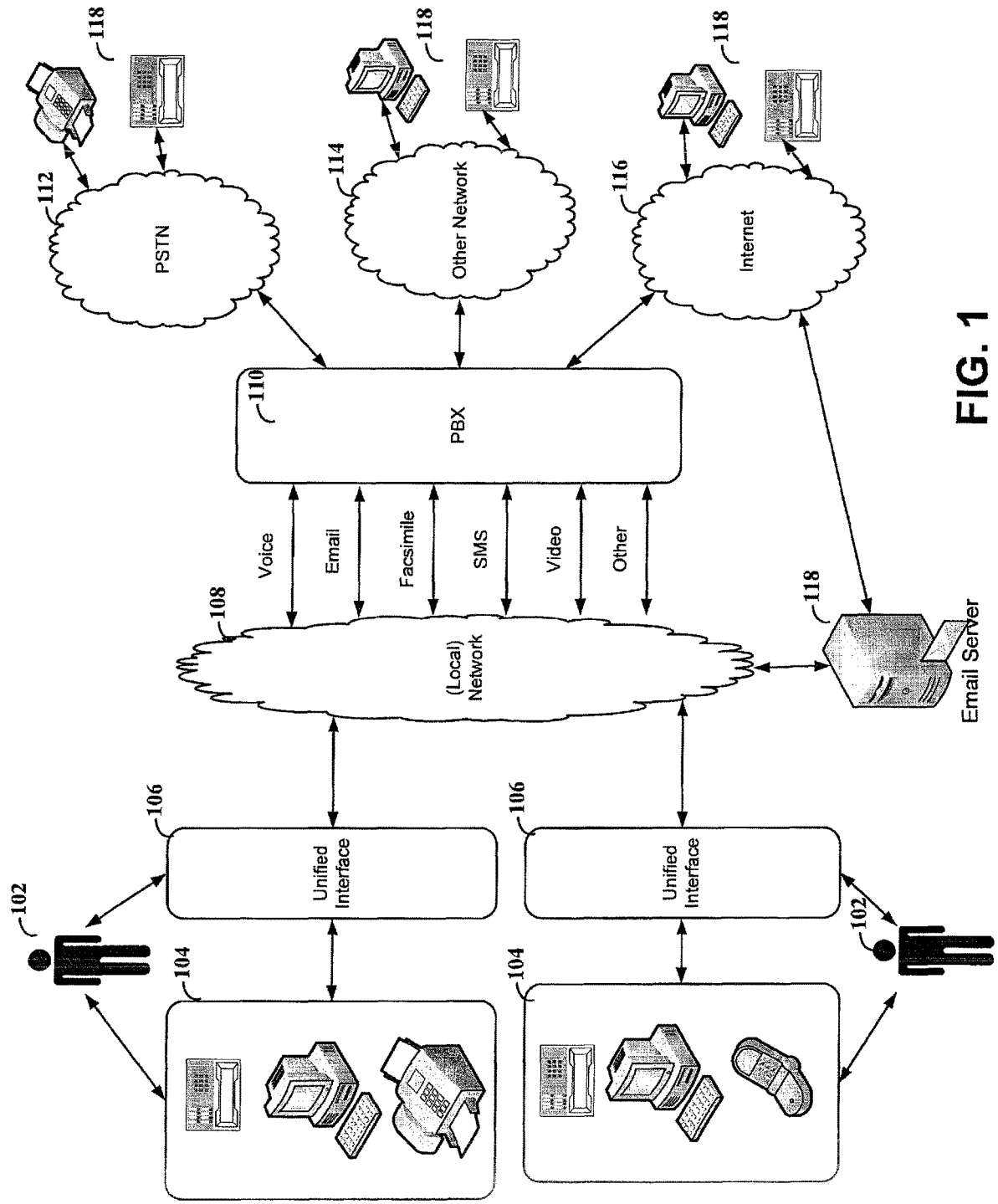
FIG. 1 depicts a system diagram that includes a unified interface designed for use with multiple communication types, consistent with an example embodiment of the present disclosure.

While the disclosure is amenable to various modifications and alternative forms, specifics thereof have been shown by way of example in the drawings and will be described in detail. Various example embodiments are implemented in connection with the approaches described in the attached Appendix A, which forms a part of this patent document and is fully incorporated herein by reference. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The present disclosure is directed to communications systems including communications systems that integrate multiple communication types for transmission over a packet-based network, such as the Internet, and related approaches, their uses and systems for the same. While the present disclosure is not necessarily limited to such applications, various aspects of the disclosure may be appreciated through a discussion of various examples using this context.

Aspects of the present disclosure relate to systems, methods and devices that are useful for providing a unified communications platform to individuals, groups and businesses. In particular implementations, a user/front-end interface consolidates a number of different features onto a single platform that includes a unified interface.

Particular embodiments of the present disclosure are directed toward offering the various functions discussed herein using cloud-based services. More specific implementations allow the functions to be accessed through a web-browsing software application. The functions can be accessed by running applications written in substantially platform independent programming language, such as Java from Sun Microsystems. This allows for increased flexibility for how and where the functions can be implemented. Accordingly, changes can be made to the functional code in a single version without necessarily requiring changes to be made for each possible platform used by different customers.

Other embodiments of the present disclosure relate to a locally-installed application that provides an interface associated with the various features discussed herein. Various embodiments of the present disclosure are configured for use with portable devices, such as smart cellular telephones.

Consistent with various embodiments of the present disclosure, a system is implemented in which a remote server, e.g., a hosted private branch exchange (PBX), coordinates VoIP calls, email and various other services so that a user of the system is presented with a single, unified interface.

FIG. 1 depicts a system diagram that includes a unified interface designed for use with multiple communication types. Individuals 102 are presented with a unified interface 106. The unified interface 106 can be accessed through a variety of different devices 104. In certain instances a local network 108 is used by multiple individuals. For instance, in an office setting, a local network 108 can be used by the employees. Each individual 102 can access various functions, some of which are discussed in more detail herein, through the unified interface 106.

Individuals 102 can be provided with a private branch exchange (PBX) 110 to provide call-based functionality, which can include call routing and add-on features. The PBX 110 can also provide non-traditional features, a hosted PBX, coordination of VoIP calls, email 118 and various other services so that a user of the system is presented with a single, unified interface. PBX 110 can be configured to interface with multiple different networks including, but not necessarily limited to, the PSTN 112, the Internet 116 and other networks 114. This allows for multiple different communications links to be established between devices 104 and devices 118. These devices can include audio-enabled devices, such as PSTN-based telephones, VoIP telephones and computer-based soft VoIP telephones. Other devices can include facsimile machines and computers.

Embodiments of the present disclosure are directed toward the functionality of PBX 110 being provided as a cloud computing service. The cloud computing service can include various additional features so as to provide a unified communications platform. Particular implementations allow the cloud-based unified communications platform to be accessed using a common web-browser.

Accordingly, a system or device can be configured with a first interface that is configured and arranged to provide content to a remote web-browser. This first interface can be provided by a computer server designed to implement a website. A second interface is configured and arranged to communicate content of an audio telephone calls with a remote audio-enabled device. This second interface can also communicate video content, text content, document sharing content and/or desktop sharing content.

A processing circuit is configured and arranged to establish an audio telephone call between the remote web-browser and the remote audio-enabled device. The processing circuit can also facilitate communications with social networks by passing a general status message to a plurality of interface modules, each interface module designed to interface with a corresponding and respective social network.

Figure 2:
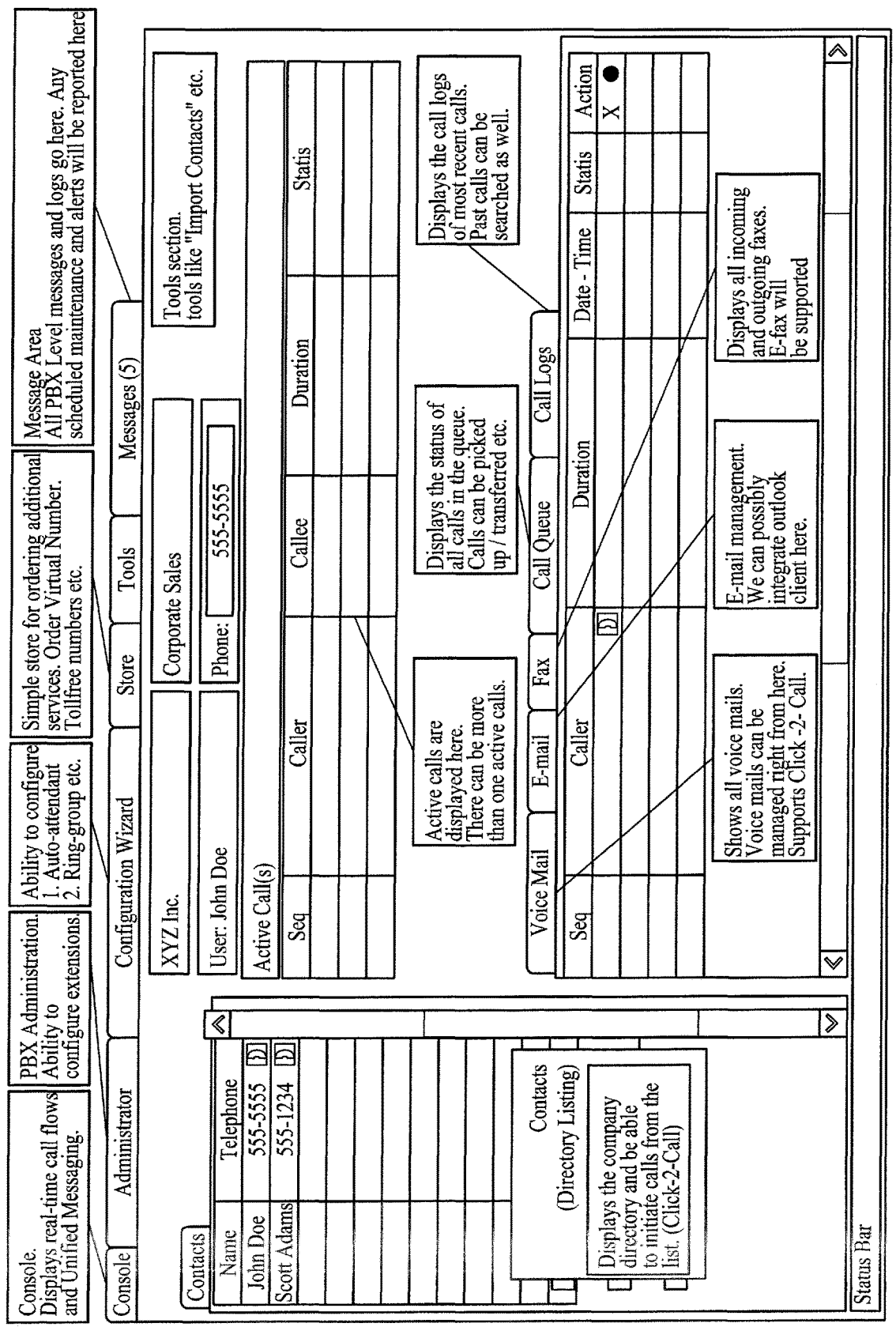
FIG. 2 depicts a graphical user interface (GUI) for providing a user with information and control over multiple communication types, consistent with an example embodiment of the present disclosure.

FIG. 2 depicts a graphical user interface (GUI) for providing a user with information and control over multiple communication types, consistent with an example embodiment of the present disclosure. The GUI of FIG. 2 represents an example interface that consolidates multiple different types of communications and messages in a single interface. Moreover, the depicted GUI can be presented entirely within a web browser.

Aspects of the present disclosure relate to embodiments in which the unified interface shows the status of all current calls and allows for automatic and manual routing of calls. Such aspects can be particularly useful for call-center type applications, such as sales and marketing. For instance, both incoming and outgoing calls can be routed between available operators as desired. An integrated sales option facilitates access to sales/customer data for use in a business environment.

The unified interface can include a voicemail tab that displays stored voicemail messages. The unified interface can display, if available, from whom the voicemail originated, time of call, length of message and whether or not the voicemail has been previously listened to by the user. Moreover, the unified interface can also provide a text version of the voicemail using voice-to-text services. A particular embodiment of the present disclosure links the voicemail to remote services, such as a cloud computing service offered by a remote server. This remote service can perform the voice to text translation.

The unified interface can also include one or more email tabs that display email messages for one or more email accounts. Another option on the unified interface includes a facsimile tab, which can display images associated with the facsimile messages. A call queue tab can show a list of callers on hold, or otherwise waiting. The unified interface provides a simple click/drag option that can transfer calls from the queue to other destinations as desired.

Aspects of the present disclosure provide extensive reporting and recording services. This can include detailed call logs, which can be linked to sales records, customer complaints, service records and other information/databases. Thus, by clicking on a call record/log, a user of the unified interface system can see a list of available information that is associated therewith. Moreover, when an incoming or outgoing call is initiated, information linked to the other party can be automatically displayed or otherwise made available (e.g., in response to caller ID or ANI information). The desired information can then be easily accessed without necessarily having to access an entirely different interface and/or software application.

Other aspects of the present disclosure relate to a contact list within the unified interface. Entries in the contact list can include numerous different contact options for reaching the individual. These can include, but are not limited to, telephone numbers, cellular numbers, email, facsimile numbers, SMS/MMS texting and/or instant messaging options. Any of the available options can be accessed and used from a single interface. Moreover, embodiments of the present disclosure provide for intelligent scripting to be added to facilitate often-repeated functions.

The unified interface can also provide a call list that displays all active calls. The active calls can include those to a particular individual, to a particular group of individuals, or to all individuals within the organization or company. For instance, this can allow individuals to ascertain to whom a queued call should be transferred based upon the current call status.

A particular aspect of embodiments of the present disclosure relates to a store/purchasing option that facilitates the purchase of additional features (e.g., new telephone lines) by operators of the unified interface. The system can be designed to provide easily expandable/configurable services that allow for automated purchasing and upgrading through the unified interface. In this manner, purchasing of new features and new telephone extensions, as well as modifications to existing features, can be seamlessly implemented while still providing a revenue stream. This can be particularly useful for providing an easily scalable platform and for reducing the overhead necessary to sell and support the system. The unified interface can also include a tab that allows extensions to be changed by a user thereof.

Embodiments of the present disclosure also support the implementation of ring groups. These ring groups include a plurality of telephone number or extensions that are each linked to an incoming call. For instance, a technical support line may be linked to several extensions; these extensions forming a ring group. When calls to the technical support line are received, the extensions within the ring group are accessed. The manner in which an incoming call is linked to the ring group can vary and be configured as desired. For example, all extensions in the ring group can be notified (e.g., all phones can ring), one of the extensions can be randomly selected, only available extensions can be selected and/or extensions can be rotated/sequentially selected. In a particular implementation of the unified interface, the queue feature can be used to notify all interfaces within the ring group of an incoming call. Any of the individuals at the extensions can choose to receive the call.

Multiple call handling features can also be provided by the unified communications platform. These features include, but are not limited to, call transfer, call hold, resume and others.

As discussed herein, many of the features and embodiments can be applied to both inbound and outbound calls. For instance, consistent with certain implementations of the present disclosure and auto-attendant feature can be used to respond to incoming calls. Call queuing and auto attendant can also be implemented for outbound calling. Outbound calls can be automatically dialed and if no operator is currently available, an auto attendant can be used. Once a live operator is available, or after the auto attendant has completed, the called party can be connected to the live operator. For the sake of brevity, the corollary between inbound and outbound calls is not discussed in all instances.

Aspects of the present disclosure include a module for performing PSTN to IP handling with facsimile messages. This can include, for example, conversions relating to T.38 to T.30 standards. Other aspects relate to the ability to queue outbound facsimiles for efficient delivery/conversion. For instance, outbound facsimiles can be queued and sent at times determined by transmission costs, preferred delivery times and available bandwidth. Other aspects allow for the routing of facsimiles over email and for the use of mobile fax to cellular capable portable devices.

Embodiments of the present disclosure relate to group calling functions and/or conferencing features. One such embodiment relates to calls within organization. A conference can be created from the unified interface. Any individual that is invited to the conference will have the conference displayed on their respective interface. The system allows the individuals to each enter and leave the conference as they desire. Moreover, the status of each individual can be shown to other participants.

Consistent with another embodiment of the present disclosure, the system provides a highly-configurable mechanism for sharing of status/control information between individuals. For instance, users within a common group can designate that a call status should be shared with others (e.g., to allow sales force members to see that others of the team are speaking to certain clients). This can also be used to request assistance from members of another group. A user can chose to share a call with another group. Members of the other group are notified of the sharing and can chose to respond to provide assistance. For instance, a sales individual can share a call with a technical-support group when a potential customer desires certain technical details.

Other aspects of the present disclosure relate to the ability to setup and configure the system with tiered/hierarchical access to information through the unified interfaces. The tiered structure can be, for example, a manager at the top, followed by team leaders and finally team individuals at the bottom. One access configuration method allows access to same level or below. In this manner, a manager can monitor calls, direct calls, intercept calls or enter/interrupt calls to all individuals below themselves. For instance, the unified interface allows a manager to monitor the status of those they manage. If desired, the manager can send an instant message, text or email to warn a team individual, who might be on a call, of an incoming interruption. The individual can then alert the other party on the call that the manager wishes to join the call. Similarly, a team individual can send an instant message, text or email to request interruption from a manager or other individual by selecting an option on their computer screen.

Other embodiments of the present disclosure relate to the use of a software add-in for software applications, such as document viewing/editing software applications. Such add-ins can, for example, allow the use of links within documents/emails that automatically contact the individual by launching the unified interface application (e.g., call a telephone number). A sales database may contain documents of sales, such as spreadsheets or word-processing documents. A viewer of the documents can simply click on a link within the document to initiate communication, i.e., the person can be called, emailed, texted or the like.

Using the various embodiments discussed herein, a single message can easily be sent to multiple individuals using different mechanisms. Certain embodiments allow for a set of rules to be implemented to determine how the message is routed to each of the individuals. For instance, depending upon the contact information available, each individual can receive the message via one or more of email, fax, voicemail or text message. The unified interface provides the option for a user to define a rule-set that determines how the messages are formatted, transmitted or otherwise communicated. For one or more individuals, a text to speech or a recording can be sent directly to voicemail, whereas for other individuals, an email or facsimile can be sent. In certain embodiments, external voicemail systems can be directly accessed using, for example, backdoor call options such as slydial-type services. The rule set can be designed by the sender and/or by recipient feedback for how messages are preferred to be received. Other aspects of the present disclosure recognize that the unified interface can be configured to provide visual voice-mail that can include a text-based representation of an audio message.

Embodiments of the present disclosure allow a user to move messages between different communication formats and data-types. For instance, by clicking and dragging a voicemail message to a tab for email, the unified interface can transmit the voicemail to the associated email account. Similar actions can be implemented for voicemail, email or fax. The formatting can be automatically assigned, designated according to a rule set, or selected by the user at the time the movement of the message is requested. For instance, the user can be presented with an option to move voicemail to email as an audio recording file or a converted text file. Another option could be to move facsimile message to email account, e.g., as an image file, or to send an email as facsimile transmission. Various conversion options can be implemented using a local software application or sent to an external server or cloud application.

Aspects of the present disclosure allow for a user to integrate a corporate directory for a company at which they work. For instance, the corporate directory can be imported from a Microsoft Outlook Exchange Server. Multiple other contact lists can also be maintained.

FIG. 3 depicts a system diagram for interfacing with social networks, consistent with embodiments of the present disclosure. Consistent with various embodiments of the present disclosure social networking sites, such as Facebook and Twitter, are accessible to individuals 302 with the unified interface 306 and using devices 304. For instance, one integration tool allows contacts to be imported from a social networking application/site. The importation can be wholesale (all acquaintances on the social network), limited to a selected subset, or incrementally approved. The importation can be a one-time/manually prompted action or an ongoing synchronization. The ongoing synchronization can detect changes to an existing acquaintance, new acquaintances or the removal of acquaintances. For instance, when another acquaintance is added to the social network, the new acquaintance can be added automatically to a contact list that is accessible as part of the unified interface. Moreover, a number of interface features allow for communications using the social network.

In certain implementations, status updates can be posted and viewed from the unified interface. The status updates can be manually entered or they can be automatically posted depending upon user settings. For instance, the unified communications platform status can be configured to update a status indication on a social network in response to an established a connection using the unified interface. This can include, but is not limited to, joining a meeting or placing/answering a telephone call.

In other instances, messages can be retrieved and posted to the social networks. These messages can be automated or manually implemented depending upon the configuration of the unified communications platform. Automated messages might update status indicators to indicate that an individual has logged in to the unified interface. The status can also indicate when an individual is participating in a conference or telephone call. Other status indicators might update the location of an individual based upon where the unified interface is accessed.

Certain embodiments involve the use of a set of general status messages that are generated for a corresponding event, independent from any particular social network. One or more formatting/interface modules 312, 314, 316 provide integration to corresponding social networks by receiving a general status message and updating the respective social network status. For instance, the unified communications platform 308 can generate a single message for a status update 310 that indicates that an individual is busy due to a meeting that is in progress. This single message can be presented to any of a number of different modules. A first module might post a message of this status on a site such as Twitter, a second module might update a chat status to busy/unavailable on an instant message application (e.g., as available on many different social networks), a third module might do nothing (e.g., for a social network that is not setup for real time status updates.

Certain embodiments are directed toward the unified communications platform initiating text-based, audio-based and/or video based chat sessions using an instant messaging service provided as part of the social network.

This use of different modules can be particularly useful for allowing the seamless integration of the unified communications platform to multiple different social networks. Moreover, a single change made to the message generation component will be effective for each of the different social networks. For instance, additional status update options can be added to the functionality of the unified communications platform without the need to make substantial modifications for each different social network. Moreover, different filters can be set in each interface module to allow an individual to use multiple social networks with different levels of interaction. For instance, an individual may want audio call-status (active call, no current call) to be displayed on a first social network (e.g., Google Talk), but not on a second social network (e.g., Facebook), whereas both social networks can be configured to display the login/online status for the individual.

Embodiments of the present disclosure also provide status updates of other individuals to be imported from social networks and viewed using the unified interface. For instance, the unified interface can be configured to display status information for contacts, where at least some of the status information is provided from a contact's profile on a social network.

Aspects of the present disclosure are directed toward the ability of the unified communications platform to provide different levels of status information to different groups. The groups can be determined based upon individually-defined groups or upon other groupings, such as a distinction between status updates to social networks and status updates to individuals in the corporate directory and/or other users of the unified communications platform.

These and other aspects can be useful for providing a seamless integration with services such as Google Talk, XMPP and/or Jabber. The embodiments of the present disclosure are not limited to such specific services, but such embodiments can be useful to understand and appreciate the flexibility and portability of the unified communications platform. Social networks and related services are constantly changing. This includes changes to existing networks and services, as well as entirely new networks and services. These changes and additions can be accounted for using the modular approach discussed herein.

Various embodiments of the present disclosure are directed toward providing flexible call and video recording options. As discussed herein, the unified communications platform can provide various audio and video communications options including conferencing features with audio and/or video. Whether dealing with a direct connection between two parties or a conference situation with many parties, the unified communications platform provides an individual with the option of recording the audio, video and/or shared conference documents and displays. The unified communications platform can be configured to perform the recording as a cloud-based service. This allows an individual to access the recorded content at a later date at virtually any location using the unified interface. Alternatively, or in addition, the recorded content can be stored locally (e.g., as a file stored on a local storage medium).

Embodiments of the present disclosure are directed toward an integrated conference bridge that provides meeting features using the unified interface. One aspect of the integrated conference bridge includes the ability to create a meeting with a single meeting start button/selection. For instance, an individual can select one or more contacts. The unified interface can be configured to automatically generate a selection option to start a meeting. If the individual selects the option, each of the selected contacts is provided with a meeting invitation. A conference/meeting bridge automatically initiates a meeting that the invited contacts can join. The meeting invitations can be sent in a variety of different manners including, but not limited to, email, text, social network messages/status updates and/or a direct telephone call.

Once meeting is initiated/established, the conference/meeting bridge can be controlled using the unified interface. Meeting controls allow a number of different functions such as content sharing, individual window sharing, desktop sharing and the ability to invite additional participants, which can occur in real time.

Embodiments of the present disclosure are directed toward forwarding options for calls, meeting invites and similar information. In one implementation, a single forwarding number can be selected and used. More advanced forwarding is also possible using easily configurable forwarding rules. The rules can use any number of different input criteria to determine the forwarding number. For instance, caller ID can be used to determine where (and if) to forward a call. Thus, personal calls, as indicated by the caller ID can be routed to a mobile phone, while business calls can be routed to an office phone. Another possible criterion includes the time of day. The unified communications platform can also attempt to locate an individual in real time as part of a Find-me-Follow-me feature.

These and other aspects of the present disclosure can be implemented in a number of different manners including, but not limited to, stored executable data on tangible medium, computer processors, programmable logic, hardware circuit logic, processing circuits and combinations thereof. Aspects of the present disclosure can be implemented using general purpose computers that have been specially configured with instructions stored on a tangible medium. Various functions described herein are thereby able to be carried out by modifying one or more general purpose computers to function as specially program computers. It is also possible that various functions can be implemented through the design of electronic hardware logic devices. There is flexibility between configuring a device using stored instructions, specially programmed logic circuits, or combinations thereof.

The various embodiments described above are provided by way of illustration only and should not be construed to limit the disclosure. Based upon the above discussion and illustrations, those skilled in the art will readily recognize that various modifications and changes may be made to the present disclosure without strictly following the exemplary embodiments and applications illustrated and described herein. For example, the methods, devices and systems discussed herein may be implemented in connection with voice-over Internet services, streaming media and call-processing. The disclosure may also be implemented using a variety of approaches, such as those involving a number of different operating systems and software programs/packages or using approaches in the attached Appendix A. Such modifications and changes do not depart from the true spirit and scope of the present disclosure, including that set forth in the following claims.

What is claimed is:

1. A system comprising:
a communications platform, including a plurality of servers and processing circuitry, to
provide data communications services involving a plurality of different or disparate communications systems respectively associated with a plurality of respectively different formats to a plurality of communication user-operable devices each of which having a user interface for communicating information;
convey the data communications services via a browser;
establish an electronic meeting between multiple individuals, the electronic meeting to provide access to a plurality of different types of content or of different format types; and
generate, in response to the electronic meeting being established, a status message that is associated with the electronic meeting, that provides an update message to at least a subset of the plurality of different or disparate communications systems, and that provides information regarding possible availability of an individual for participating in the electronic meeting.

2. The system of claim 1, wherein the communications platform is to provide an integration of messages communicated, on behalf of a client entity to receive the data communications services, to a plurality of different social networks.

3. The system of claim 1, wherein the communications platform is to provide an integration of a single change to a message generation component, on behalf of a client entity to receive the data communications services, to be effective for data communications to a plurality of different social networks.

4. The system of claim 1, further including a plurality of interface modules communicatively integrated with the communications platform, wherein at least one of the plurality of interface modules is to provide the status message to a social network and another of the plurality of interface modules is associated with a social network that is not to receive and process the status message.

5. The system claim 1, further including a plurality of interface modules communicatively integrated with the communications platform, wherein the communications platform is to facilitate communications involving the plurality of different or disparate communications systems, by generating a presence status message in response to and indicative of an audio telephone call being established by said individual or another individual.

6. The system claim 1, further including a plurality of interface modules communicatively integrated with the communications platform, wherein the communications platform is to facilitate communications involving the plurality of different or disparate communications systems by communicating content in a different one of a plurality of respective formats.

7. The system of claim 1, wherein the plurality of different types of content, or of different format types are from among: email, chat, facsimile, audio and video.

8. The system of claim 1, wherein the communications platform is to pass the status message to a circuit arrangement including at least one CPU and a plurality of interface modules, each of the plurality of interface modules including respective circuitry configured to respond to the status message by interfacing with at least one of the plurality of different or disparate communications systems according to a corresponding one of the plurality of different types of content.

9. The system of claim 1, wherein the communications platform is to communicate audio content, of one or more audio telephone calls, with a user device that includes logic and sound-generation circuitry.

10. The system of claim 1, wherein the communications platform is to communicate over at least one of a plurality of communication networks that includes the Internet, and the communications platform is to provide the data communications services over said at least one of a plurality of communication networks.

11. The system of claim 10, further including a public switch telephone network (PSTN), whereby the communications platform is to provide the data communications services over the PSTN.

12. The system of claim 1, wherein the communications platform is to route calls, as part of the data communications services, over one or more broadband communication networks.

13. The system of claim 1, wherein the communications platform is to receive incoming calls and to route the incoming calls over a plurality of communication networks, selectively based on whether the incoming calls are to be answered as a personal call or a business call.

14. The system of claim 1, wherein the communications platform is to receive incoming calls and to route the incoming calls over a plurality of communication networks, selectively based on whether the incoming calls are to be answered during a certain time of the day.

15. The system of claim 1, wherein the communications platform is to operate, on behalf of respective client entities receiving the data communications services, as private branch exchanges (PBXs).

16. The system of claim 1, wherein the data communications services include provision of content that is conveyed through the plurality of servers and that is to be communicated in a plurality of different formats, the plurality of different formats being from among the following: video content, text content, and at least one of document sharing content and desktop sharing content.

17. The system of claim 1, wherein the update message is to indicate whether an individual has joined the electronic meeting.

18. The system of claim 1, wherein the update message is to indicate whether an individual is involved in a telephone call.

19. The system of claim 1, wherein the communications platform is to generate the status message as a single message to be processed by each of a plurality of interface modules.

20. The system of claim 1, wherein the communications platform is to generate the status message as one of a set of general status messages that are generated by the communications platform for a corresponding event.

21. A method comprising:
providing data communications services involving a plurality of different or disparate communications systems respectively associated with a plurality of respectively different formats to a plurality of communication user-operable devices;
conveying the data communications services via a browser;

establishing an electronic meeting between multiple individuals, the electronic meeting providing access to a plurality of different types of content, or of different format types; and generating, in response to the electronic meeting being established, a status message that is associated with the electronic meeting, that provides an update message to at least a subset of the plurality of different or disparate communications systems, and that provides information regarding possible availability of an individual for participating in the electronic meeting.

22. A method comprising:

providing data communications services involving a plurality of different data communications systems respectively associated with a plurality of respectively different formats to communication user-operable devices;

conveying the data communications services via a browser;

establishing an electronic meeting between multiple individuals, the electronic meeting providing access to a plurality of different types of content, or of different format types; and generating, in response to the electronic meeting being established, a status message that is associated with the electronic meeting, that provides an update message to at least a subset of the plurality of different data communications systems, and that provides information regarding possible availability of an individual for participating in the electronic meeting.

\* \* \* \* \*